US010277888B2

(12) United States Patent
Campbell et al.

(10) Patent No.: US 10,277,888 B2
(45) Date of Patent: Apr. 30, 2019

(54) DEPTH TRIGGERED EVENT FEATURE

(71) Applicant: QUALCOMM Incorporated, San Diego, CA (US)

(72) Inventors: Shandon Campbell, San Diego, CA (US); Kalin Mitkov Atanassov, San Diego, CA (US); Karthikeyan Shanmugavadivelu, San Diego, CA (US); Stephen Michael Verrall, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 528 days.

(21) Appl. No.: 14/598,791

(22) Filed: Jan. 16, 2015

(65) Prior Publication Data
US 2016/0212410 A1 Jul. 21, 2016

(51) Int. Cl.
H04N 9/47 (2006.01)
H04N 7/18 (2006.01)
H04N 13/271 (2018.01)
H04N 5/225 (2006.01)
G06K 9/32 (2006.01)
H04N 5/232 (2006.01)
H04N 13/00 (2018.01)
G01S 17/46 (2006.01)

(52) U.S. Cl.
CPC ........ H04N 13/271 (2018.05); G06K 9/3241 (2013.01); H04N 5/2253 (2013.01); H04N 5/232 (2013.01); H04N 5/23212 (2013.01); G01S 17/46 (2013.01); G06T 2207/10012 (2013.01); G06T 2207/10028 (2013.01); G06T 2207/10152 (2013.01); H04N 2013/0081 (2013.01)

(58) Field of Classification Search
None
See application file for complete search history.

(56) References Cited

U.S. PATENT DOCUMENTS

| 8,588,517 | B2 | 11/2013 | Lee et al. |
| 8,760,567 | B2 | 6/2014 | Hamamura |
| 9,607,394 | B2 * | 3/2017 | Yan ........................... G06T 7/11 |
| 2004/0057613 | A1 * | 3/2004 | Noto ....................... G06T 7/586 |
| | | | 382/154 |
| 2004/0258279 | A1 | 12/2004 | Hirvonen et al. |
| 2006/0139314 | A1 * | 6/2006 | Bell ......................... A63F 13/02 |
| | | | 345/156 |

(Continued)

OTHER PUBLICATIONS

International Search Report and Written Opinion—PCT/US2015/066301—ISA/EPO—dated Apr. 6, 2016.

*Primary Examiner* — Talha M Nawaz
(74) *Attorney, Agent, or Firm* — Paradice and Li LLP

(57) ABSTRACT

Systems and methods of triggering an event based on meeting a certain depth criteria in an image. One innovation of a method includes a identifying at least one object in a field of view of an imaging device, the imaging device configured to capture at least one image of the field of view, determining a threshold depth level, measuring a depth of the at least one object within the field of view with respect to the imaging device, comparing the measured depth of the at least one object to the threshold depth level, and capturing an image of the object when the depth of the object within the field of view exceeds the threshold depth level.

30 Claims, 8 Drawing Sheets

(56) References Cited

U.S. PATENT DOCUMENTS

| | | | |
|---|---|---|---|
| 2012/0026277 A1* | 2/2012 | Malzbender | H04N 7/15 348/14.07 |
| 2012/0182397 A1 | 7/2012 | Heinzle et al. | |
| 2012/0242803 A1 | 9/2012 | Tsuda et al. | |
| 2012/0249738 A1* | 10/2012 | Gilboa | G01S 17/89 348/46 |
| 2013/0147937 A1 | 6/2013 | Ren et al. | |
| 2013/0229485 A1* | 9/2013 | Rusanovskyy | H04N 19/597 348/43 |
| 2013/0307937 A1 | 11/2013 | Kim | |
| 2013/0314558 A1* | 11/2013 | Ju | H04N 5/23222 348/208.99 |
| 2014/0009574 A1* | 1/2014 | Hannuksela | H04N 19/597 348/42 |
| 2014/0098195 A1* | 4/2014 | Pace | H04N 13/0242 348/47 |
| 2014/0267243 A1* | 9/2014 | Venkataraman | G06T 7/557 345/419 |
| 2014/0267633 A1 | 9/2014 | Venkataraman et al. | |
| 2015/0161798 A1* | 6/2015 | Venkataraman | G01P 3/38 348/47 |
| 2015/0170370 A1* | 6/2015 | Ukil | G09G 5/377 382/154 |
| 2015/0264337 A1* | 9/2015 | Venkataraman | G01P 3/38 348/47 |
| 2015/0269737 A1* | 9/2015 | Lam | H04N 13/0011 382/154 |
| 2015/0339824 A1* | 11/2015 | Uliyar | H04N 13/232 348/46 |
| 2016/0180510 A1* | 6/2016 | Grau | G06T 7/80 348/47 |
| 2016/0234510 A1* | 8/2016 | Lin | H04N 13/0048 |
| 2016/0344996 A1* | 11/2016 | Olilla | H04N 5/332 |
| 2017/0094243 A1* | 3/2017 | Venkataraman | G06T 7/557 |

* cited by examiner

DEPTH TRIGGERED EVENT FEATURE

BACKGROUND

Field of the Invention

The present application relates generally to a determination of a depth of an object in a field of view (FOV), and more specifically, to systems, methods, and devices for automatically detecting and capturing photographs and video frames or performing other actions based at least in part on the depth of an object within a scene or FOV of an imaging system.

Description of the Related Art

Users often experience moments or events which they would like to capture, in photographs or video, and review at a later date and/or time, for example, a child's first steps or words, graduation, or a wedding. Often, these moments or events may be static and their occurrence generally predictable (e.g., a wedding, a graduation, a serene landscape, or a portrait) and may be fully captured at a specific depth by the user utilizing imaging equipment, such as a camera, video recorder, or smartphone, etc. However, sometimes capturing scenes with objects or events at a specific depth at the right time may present a challenge, especially if the scene contains moving objects or if the camera is subjected to quick panning. For example, capturing a bird flying through a group of trees or capturing a child walking while the camera must pan with the moving object.

Even when the user of the equipment captures the scene at the proper moment or utilizes a multi-shot system, the user must be aware when the moment or event is going to occur, must have the imaging equipment prepared and pointing in the proper direction, and must be attentive to the scene and events around him or her. Additionally, the user must still activate the equipment at the exact moment to ensure capture of the entire scene. Thus, to account for the time required for the user to recognize the moment of action and activate the imaging equipment and for the imaging equipment to capture the scene, it is inevitable that at least some portion of the scene may have passed without being captured and thus be lost from the user's later review, or may be captured at an incorrect depth or improper focus. Accordingly, systems and methods to facilitate capturing objects or events based on a depth triggering event would be beneficial.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved capture of moments of action by a user with imaging equipment.

One aspect of the subject matter described in the disclosure provides a method for capturing a scene. The method comprises identifying at least one object in a field of view of an imaging device. The imaging device is configured to capture at least one image of the field of view. The method further comprises establishing a threshold depth level and measuring a depth of the at least one object within the field of view with respect to the imaging device. The method also comprises comparing the measured depth of the at least one object to the threshold level and capturing an image via the imaging device of the object in the field of view when the depth of the object within the field of view exceeds the threshold level.

Another aspect of the subject matter describes an apparatus for capturing a scene. The apparatus comprises an imaging system configured to capture at least one image in a field of view and a processor operably coupled to the imaging system. The processor is configured to identify at least one object in the field of view and establish a threshold depth level. The processor is also configured to measure a depth of the at least one object within the field of view with respect to the imaging system and compare the measured depth of the at least one object to the threshold depth level. The processor is further configured to capture an image via the imaging system of the object in the field of view when the depth of the object within the field of view exceeds the threshold level.

Another aspect of the subject matter described in the disclosure provides an apparatus for capturing a scene. The apparatus comprises means for identifying at least one object in a field of view of an imaging device and means for establishing a threshold depth level. The apparatus further comprises means for measuring a depth of the at least one object within the field of view with respect to the imaging device and means for comparing the measured depth of the at least one object to the threshold level. The apparatus also comprises means for capturing an image of the object in the field of view when the depth of the object within the field of view exceeds the threshold level.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
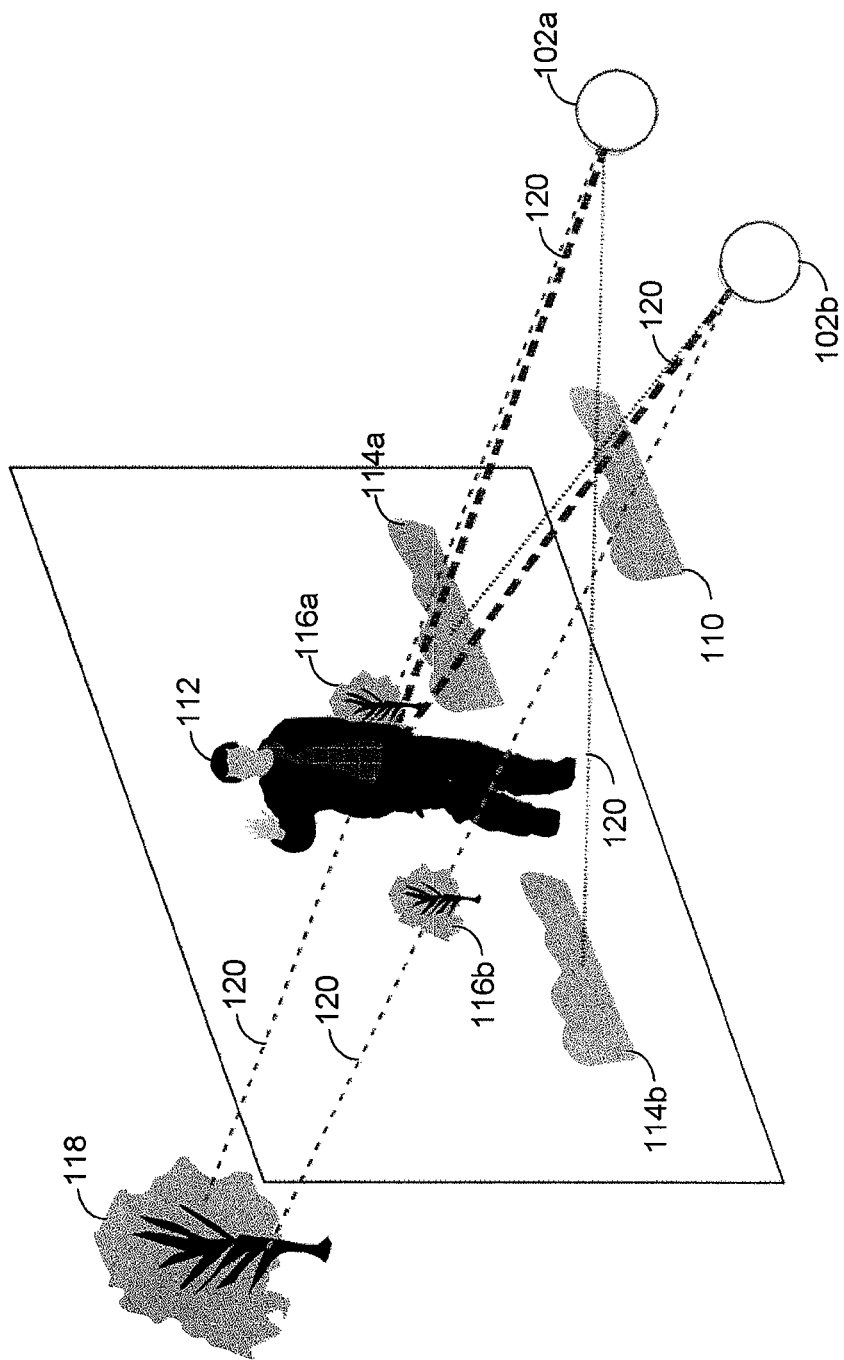
FIG. 1 illustrates an exemplary diagram of a manner or method of determining a depth of a target object, for example, via stereo optics.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure may be thorough and complete, and may fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure defined by the appended claims and equivalents thereof.

In photography, a user may capture images containing objects or events at various depths within the captured scene. When the user is actively monitoring an imaging equipment and manually controlling the imaging equipment, the user may be able to capture an image of a target object when the target object is at a desired depth in a field of view or scene. However, even when manually controlling the imaging equipment, capturing the target object at the desired depth may be difficult when the scene contains multiple moving objects or if the imaging equipment is being panned (for example, moved to follow the target object or moved to detect the target object). For example, properly focusing on the target object while it is moving in a scene with many other moving objects may be difficult.

When the user is not actively controlling the imaging equipment, for example, when the imaging equipment is set up to capture images automatically, the capture of the target object at the desired depth may be further complicated, especially if the imaging equipment comprises a single camera or image capture sensor. This may be due to the difficulty of a single camera/image capture sensor device to determine the depth of the target object. In some embodiments, in order to attempt to capture the image of the target object at the desired depth, the imaging equipment may be configured to capture multiple frames in succession (for example, implement a single-camera multi-shot, or burst of frame captures, mode). The imaging equipment may begin the multi-shot burst when the target object is close to the ideal depth as best as the single camera/image capture sensor imaging equipment can determine. However, such multi-shot implementations require significant overhead in memory and processing time and power to capture the multiple frames and store them in a memory for user review. Additionally, such multi-shot bursts with a single camera/image capture sensor cannot guarantee to capture the desired object or action at all. If the desired object or action is captured in a frame of the multi-shot burst, the multi-shot implementation may not properly focus on the target object, and instead focus on the background or another object in the frame, especially if the target object is in motion and/or if the imaging equipment is in motion. Alternatively, the target object may not be captured at the desired depth. Also, the user or the imaging equipment must expend additional time to review the captured frames and determine which frame is the best of the captured frames.

One exemplary solution for automatically capturing the target object may be implementing a depth-triggered event feature. The depth-triggered event feature may allow the imaging equipment comprising a stereo camera system with disparity-matching (or any other imaging system capable of reliably and accurately determining the depth of the target object) to capture the scene containing the target object at the specified depth, for example, where the target object is properly in focus regardless of the background of the scene, other objects within the scene, and motion of the imaging equipment and/or the target object. In some embodiments, the depth-triggered event feature may not wait for the target object to be properly focused, but may capture the scene when the target object attains the specified depth. In a stereo (for example, two) camera system with disparity-matching, disparity values from individually captured frames (e.g., one frame from each of the two cameras captured, the frames captured simultaneously) may be used to determine depth information for objects that are captured by both of the cameras. Based on the depth of the background scene or the depth of a user selected object, the stereo camera system may trigger an event. For example, the depth-triggered event feature may comprise the user identifying the target object or the scene to be monitored by the imaging equipment (comprising the stereo camera or other depth determining system). In some embodiments, this may involve the user selecting the target object from a viewfinder of the imaging equipment or a similar selection means. Then, the depth-triggered event feature may apply disparity-matching to measure an accurate depth of the target object or scene. As discussed above, the disparity matching may be performed by a variety of methods, including stereo optics, where depth is calculated from differences identified by each optic (as described in further detail in FIG. 1). Other methods of depth mapping may comprise structured light depth mapping and/or shading depth mapping. Based on the disparity matching and the depth threshold, the depth-triggered event may trigger an event (e.g., capture a photograph of the target object or the field of view).

Based on the depth as determined by the above methods, the depth-triggered event feature may trigger an event (e.g., a snapshot) snapshot when the target object is at the specified depth or when the identified scene produces a detected event at or exceeding the specified depth. For example, when the target image is a vehicle driving toward the imaging equipment, the depth-triggered event feature may automatically trigger a snapshot when the vehicle exceeds the specified depth (e.g., when the vehicle is at or within 20 feet of the camera, the 20 feet being the specified depth). Alternatively, the user may identify a scene to be monitored by the imaging equipment and may establish a specified depth, where the imaging equipment will capture the image of the scene when the target object enters the scene or the target object of the scene is at or within the specified depth. Further examples may be provided below. In some other embodiments, the depth-triggered event feature may be configured to trigger other events at the specified depth, for example focus on the target object at the specified depth, or record video at the specified depth, or activate a zoom feature at the specified depth, or trigger an external event at the specified depth.

FIG. 1 provides an illustration of an exemplary diagram of how a stereo camera may determine the depth of the target object. As shown in FIG. 1, the optics of the stereo camera may be located at optics 102a and 102b. While shown as individual optics 102a and 102b, the optics 102a and 102b may comprise different lenses or other optical structures within a single camera (not shown). Additionally, FIG. 1 depicts a foreground object 110, a person 112, two objects 114a and 114b at a substantially same depth as the person 112, two trees 116a and 116b in the background of the person 112, and a tree 118 in the far background of the scene. Optics 102a and 102b are shown having focus lines 120 to each of the objects described above. These focus lines may represent different points of fixation for the optics 102a and 102b. Additionally, a distance 122 is shown between the two optics 102a and 102b. The distance 122 may impact the range of the depth calculation or disparity matching of the stereo camera. For example, if the two optics 102a and 102b are closely spaced, then the perceived depth of objects within frames captures by both optics 102a and 102b will be more limited (for example, the perceived depth will not be as far) than when the distance 122 between the two optics 102a and 102b are spaced farther apart.

Viewing an object or edge from different vantage points may make the object or edge appear to be in different locations. For example, when the optics 102a views the person 112, the person 112 may appear to be in a different location than the same person 112 viewed by the optics 102b at the same time. This is because the two optics 102a and 102b are in different (or disparate) locations. Accordingly, depending on the optics 102a and 102b, the target object may be shifted slightly in one direction in relation to the position of the optics 102a and 102b. By using the distance 122 between the optics 102a and 102b and an observed disparity of the resultant image in the optics 102a and 102b, the stereo camera may be capable of determining an effective distance of the target object at a specific point of fixation.

Figure 2:
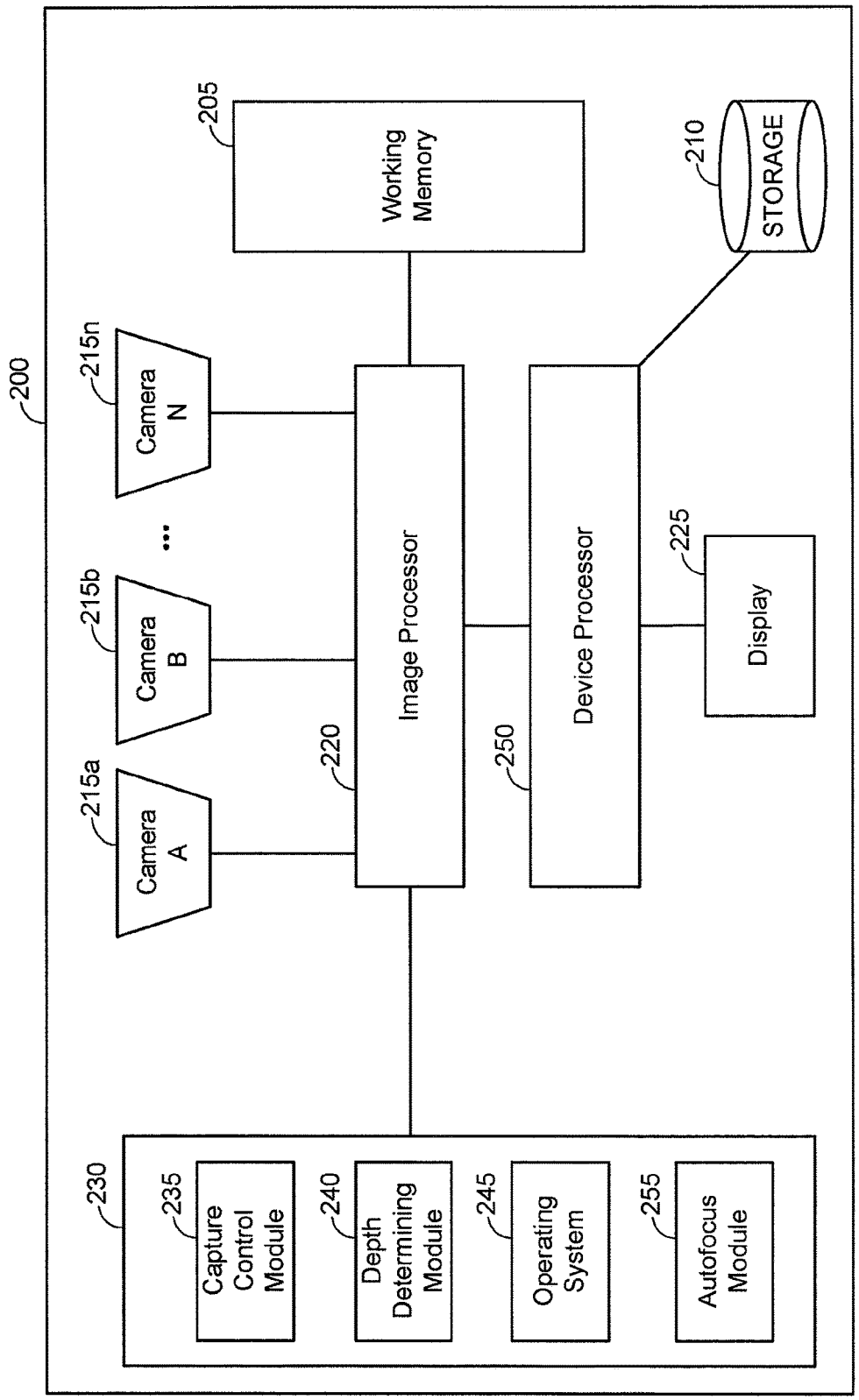
FIG. 2 illustrates a block diagram of one embodiment of an image capture device that may be used for the use cases described herein.

FIG. 2 illustrates a high-level block diagram of one possible embodiment of a device 200 having a set of components including a image processor 220 linked to a plurality of cameras or optics 215a-215n. The image processor 220 may also be in communication with a working memory 205, memory 230, and device processor 250, which in turn may be in communication with electronic storage module 210 and an electronic display 225. In some embodiments, a single processor may be used instead of two separate processors as illustrated in FIG. 2. Some embodiments may include three or more processors. In some embodiments, some of the components described above may not be included in the device 200 or additional components not described above may be included in the device 200.

Device 200 may be, or may be part of, a cell phone, digital camera, tablet computer, personal digital assistant, or the like. There are many portable computing devices in which a depth triggered event system such as is described herein would provide advantages. Device 200 may also be a stationary computing device or any device in which a depth triggered event system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras or optics 215a-215n for capturing external images. Each camera or optics 215 may include a sensor, lens system, and an autofocus assembly, among others. In general, N cameras 215a-215n may be used, where N≥2. However, some embodiments may employ only one image sensor assembly, and it will be understood that cameras or optics 215a-215n may comprise any number of image sensor assemblies suitable for an implementation of the depth triggered event system described herein. The number of cameras or optics may be increased to achieve greater depth determining capabilities of a given field of view. The cameras or optics 215a-215n may be coupled to the image processor 220 to transmit a captured image to the image processor 220. The image processor 220 or the device processor 250 may be configured to receive the captured image(s) and determine the depth of the target object captured therein accordingly. In some embodiments, the cameras or optics 215 may capture "preliminary" images that are used to determine the depth of the target object. In some embodiments, the camera or optics 215 and the processing equipment coupled thereto may not capture images to determine the depth of the objects but may rather determine the depths of the objects within the field of view from a "live" view without actually capturing an image.

The image processor 220 may be configured to perform various processing operations on received image data comprising N portions of the target image in order to output a high quality image. Processor 220 may be a general purpose processing unit or a processor specially designed for imaging applications. Examples of image processing operations include depth mapping, depth matching, or depth determination operations. These operations may be performed by the same or different processor that performs cropping, scaling (e.g., to a different resolution), image stitching, image format conversion, color interpolation, color processing, image filtering (e.g., spatial image filtering), lens artifact or defect correction, lens light roll-off or reduction of light level caused by vignette, and the like. Processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, depth determining module 240, operating system 245, and autofocus module 255. Additional modules may be included in some embodiments, or fewer modules may be included in some embodiments. These modules include instructions that configure the image processor 220 of device 200 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200 (e.g., data used for depth determinations). Additional modules or connections to external devices or hardware may not be shown in this figure but may exist to provide other depth-triggered options or actions.

As mentioned above, the image processor 220 may be configured by several modules stored in the memory 230. The capture control module 235 may include instructions that control the overall image capture functions and depth determining functions of the device 200. For example, capture control module 235 may include instructions that configure the image processor 220 to capture raw image data of a target image scene using the cameras/optics 215a-215n. Capture control module 235 may then call the depth determining module 240 to perform a depth determination technique on the N images captured by the cameras/optics 215a-215n and output a depth map or depth information to imaging processor 220. Capture control module 235 may also call the depth determining module 240 to perform a depth determination operation on raw image data in order to output a preview image of a scene to be captured, and to update the preview image at certain time intervals or when the scene in the raw image data changes.

Depth determining module 240 may comprise instructions that configure the image processor 220 to perform depth determination, depth matching, or depth mapping techniques on captured image data. For example, each of the N cameras/optics 215a-215n may capture a view of the target image according to each sensor's field of view. The fields of view may share areas of overlap and objects of overlap, as described above. In order to determine a depth of the shared objects within the final output target image, depth determination module 240 may configure the image processor 220 to perform a depth determining operation on the scenes from each camera/optics. This operation may include disparity matching, or any other depth determining operation.

Operating system module 245 configures the image processor 220 to manage the working memory 205 and the processing resources of device 200. For example, operating system module 245 may include device drivers to manage hardware resources such as the cameras 215a-215n. Therefore, in some embodiments, instructions contained in the image processing modules discussed above may not interact with these hardware resources directly, but instead interact through standard subroutines or APIs located in operating system component 245. Instructions within operating system 245 may then interact directly with these hardware components. Operating system module 245 may further configure the image processor 220 to share information with device processor 250.

Autofocus module 255 can include instructions that configure the image processor 220 to adjust the focus position of each of cameras 215a-215n, for example by controlling the movement and positioning of corresponding autofocus assemblies. Autofocus module 255 can include instructions that configure the image processor 220 to perform focus analyses and automatically determine focus parameters in some embodiments, and can include instructions that configure the image processor 220 to respond to user-input focus commands in some embodiments. In some embodiments, the lens system of each camera in the array can be focused separately. In some embodiments, the lens system of each camera in the array can be focused as a group. In some embodiments, the autofocus module 255 may be configured to receive a command from the depth determining module 240 or from one of the processors 220 or 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may include a panel display, for example, a LCD screen, LED screen, or other display technologies, and may implement touch sensitive technologies. The device processor 250 may also be configured to receive an input from the user. For example, the display 225 may also be configured to be a touchscreen, and thus may be configured to receive an input from the user. The user may use the touchscreen display 225 to input information that the processor may provide to the depth determining module 240. For example, the user may use the touchscreen to select a target object from the field of view shown on the display 225. The device processor 250 may receive that input and provide it to the depth determining module 240, which may use the input to select specific objects for the depth determination operations.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 2 illustrates a number of memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220.

Figure 3A:
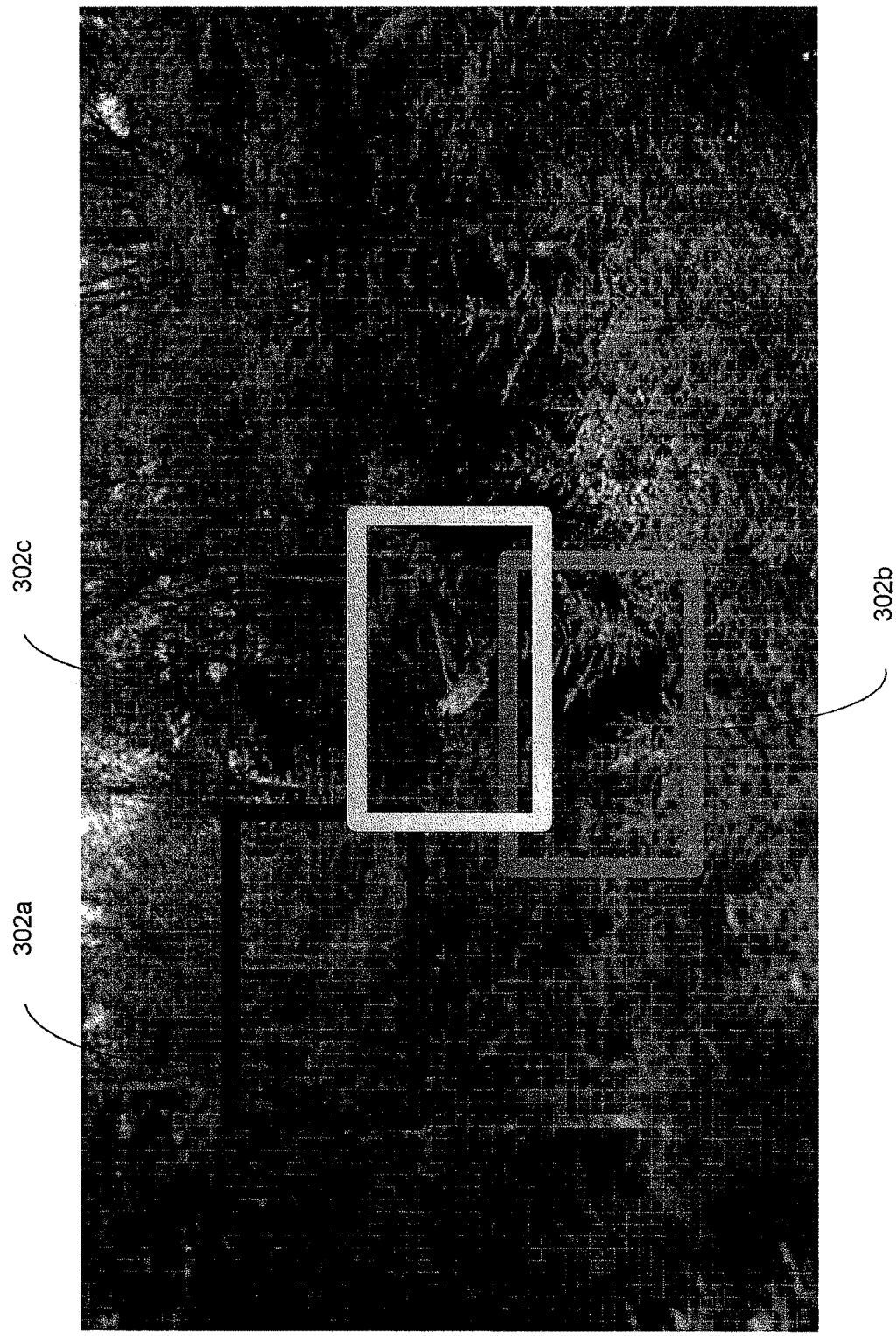
FIGS. 3A and 3B illustrates an embodiment of the image capture device of FIG. 2 used in a motion capture use case.
Figure 3B:
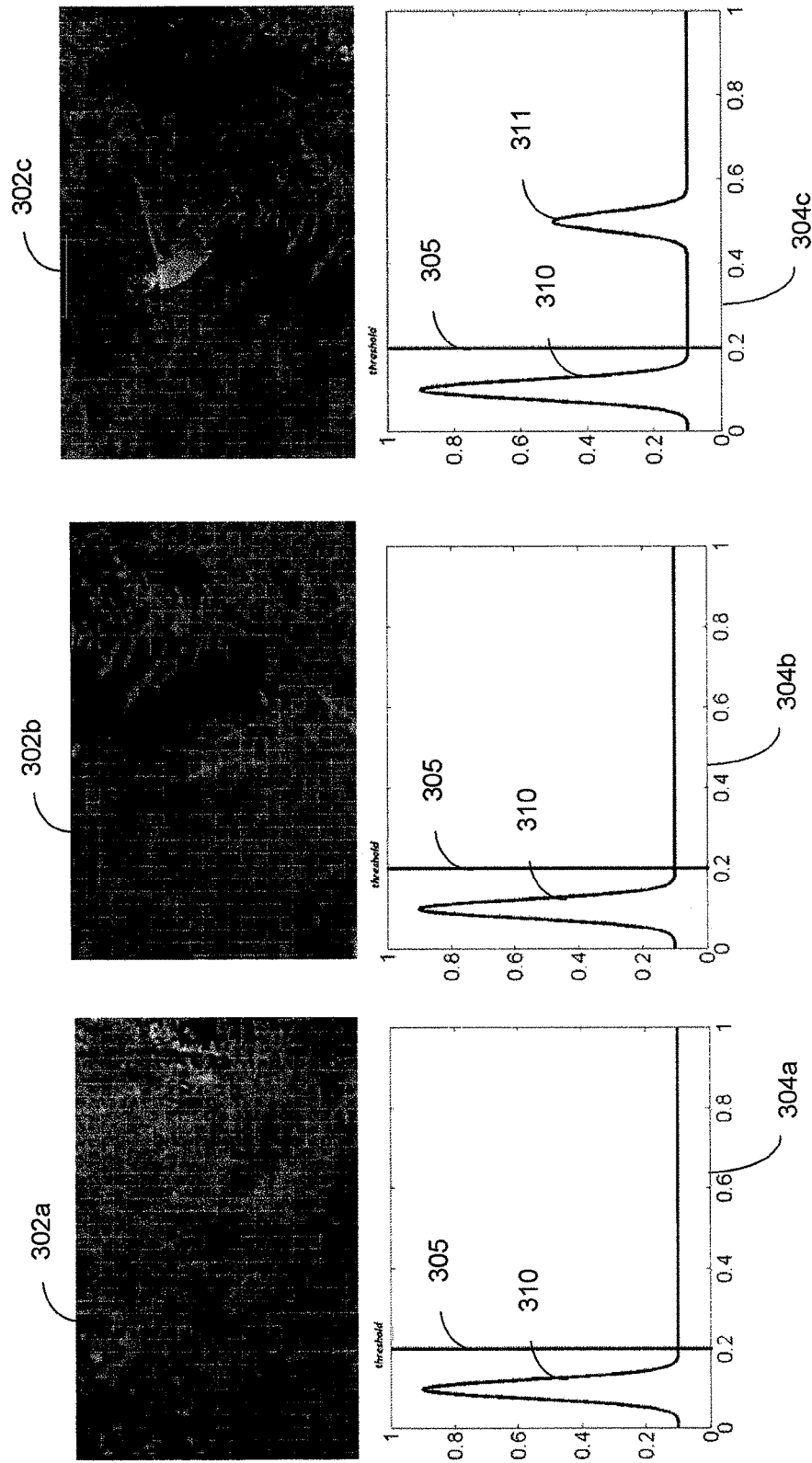

FIGS. 3A and 3B illustrate an embodiment of the image capture device of FIG. 2 being used in a motion capture use case. FIGS. 3A and 3B illustrate an exemplary implementation of the depth-triggered event feature used to capture the moving target object in the scene while the imaging equipment is panning through the scene. FIG. 3A shows a scene 300 having three smaller, individual frames 302a-302c (or points of focus) of the entire scene 300. Though not shown in this figure, a plurality of additional frames 302 of larger or smaller sizes than frames 302a-302c as depicted may be generated within the scene 300. The three frames 302a, 302b, and 302c are shown within the scene 300 and also separately from the scene 300 in FIG. 3B. Additionally, three histograms 304a-304c are depicted in FIG. 3B, each histogram 304a-304c corresponding to one of the individual frames 302a-302c. The histograms 304a-304c show a threshold depth 305 along the x-axis of each histogram. The histograms 304a-304c each also show a calculated depth of objects in the particular field of view.

The x axis of the histograms 304a-304c may correspond to the calculated depths of objects within the associated field of view. The depth values on the x-axis may be inversely related to the distance of the target object from the imaging equipment. For example, an object depicted at 0.1 on the x-axis may correspond to a background of the field of view. Thus, a lower value on the x-axis is further from the imaging equipment. The y-axis may depict a quantity of the frame filled by the object, or an intensity of the target object in the frame. For example, a background that may fill an entire frame may have a higher value on the y-axis than an object that fills only a portion of the frame.

Still referring to FIG. 3B, as shown in the histograms 304a-304c, the background of the scene has a fill or density of between 0.8 and 1 on the y-axis and shown at a depth of between 0 and 0.2 on the x-axis. A first spike 310 on each of the histograms 304a-304c may correspond to the background (for example, the trees that fill the scene 300). The first spike 310 represents the data accumulated from key points in the background (for example, the number of pixels comprising the background) and at a farthest focal position (hence the depth along the x-axis is closer to '0' than '1'. Additionally, each histogram 304a-304c shows the threshold set at 0.2. Thus, the depth-triggered event feature may be configured to perform a function once a depth greater than (or less than) the specified threshold depth of 0.2 is identified. For the frames 302a and 302b having only the background having the uniform depth, no target objects are identified and/or no events are identified that would trigger the capture of an image or trigger some other action. Additionally, no non-target objects are identified as having a different depth than the background. As can be seen in frames 302a and 302b, the portions of the scene 300 captured by the frames 302a and 302b only contain images of the background having the uniform depth. Thus, the histograms 304a and 304b only show the first spike 310 representing the background. However, the frame 302c contains the image of the background having the uniform depth along with an image of a bird that is in the foreground of the image (or at least has a lesser depth than the background). Accordingly, the histogram 304c, while depicting the first spike 310 representing the depth of the background, also shows a second spike 311 with a depth at approximately 0.5 on the x-axis with a peak fill or density of approximately 0.5 on the y-axis. This second spike 311 may represent the bird in the frame 302c. The depth of the bird is shown by the second spike 311 as being less than the depth of the background represented by spike 310 (for example, the second spike 311 has a larger value than the first spike 310 on the x-axis). Accordingly, as the depth of the bird in the frame 302c surpasses the threshold of 0.2, the bird in the frame 302c may trigger the depth-triggered event feature to perform an action, for example, capture the frame 302c. In some embodiments, multiple actions may be attributed to a single trigger. For example, when the bird enters the frame 302c and triggers the capture of the frame 302c, the same trigger may also initiate an autofocus feature so that the captured frame 302c is in focus (e.g., focuses on the bird).

Thus, in relation to the histograms 304a-304c, once the object crosses the threshold 305 in relation to the background (for example, once the object reaches as certain depth in relation to the background or the imaging equipment), then the action triggered by the depth-triggered event feature may activate. In some embodiments, the threshold 305 may be manually set by the user. In some embodiments, the threshold 305 may be automatically determined by the imaging equipment based on the depth of the background over a period of time or based on any other factors. In some embodiments, the threshold 305 may comprise multiple thresholds or a range of thresholds (not shown in this figure) representing minimum and maximum thresholds, such that an action may only be triggered when the depth is within two threshold values (e.g., the minimum and maximum thresholds).

Figure 4:
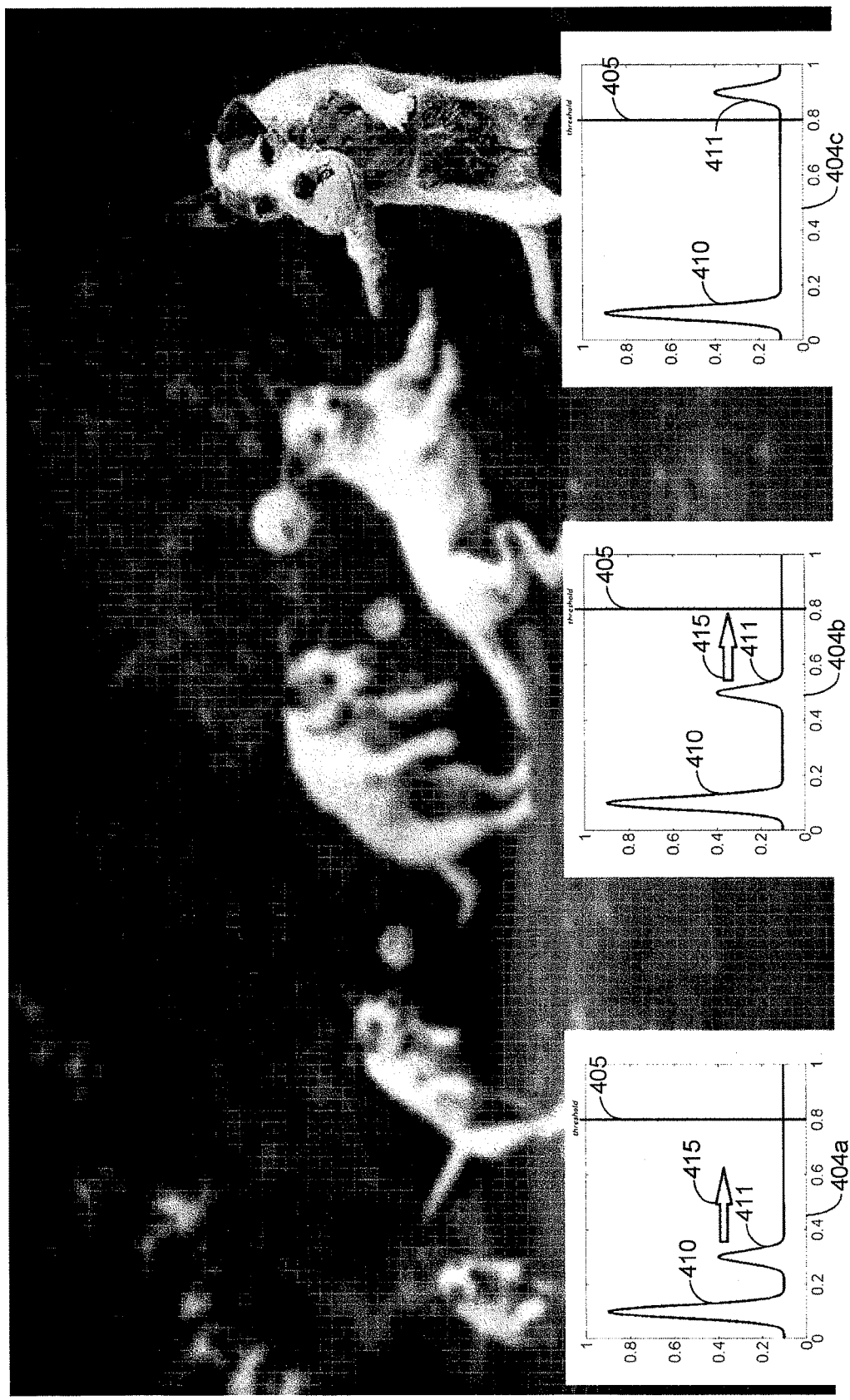
FIG. 4 illustrates an embodiment of the image capture device of FIG. 2 used in an object tracking use case.

FIG. 4 illustrates an embodiment of the image capture device of FIG. 2 used in an object tracking use case. FIG. 4 shows an exemplary implementation of the depth-triggered event feature used to track the moving target object within the field of view of the imaging equipment while the imaging equipment is either stationary or panning to follow the moving target object. The use case in FIG. 4 may track the target object until it exceeds the threshold value, at which point the image of the field of view may be captured or another action may be initiated. FIG. 4 shows a scene 400 and depicts five instances of the target object in motion throughout the field of view. As depicted, the target object is a dog that is running through the field of view chasing after a ball that is also shown progressing across the scene 400. The five different instances of the dog throughout the scene 400 show the dog and the ball becoming progressively more "in focus" as the dog travels from left to right across the scene 400 and approaches the imaging equipment (for example, the depth of the ball and the dog reduces in relation to the imaging equipment). Below the scene 400 are shown three histograms 404a-404c.

Similar to the histograms 304a-304c, the histograms 404a-404c depict a first spike 410 between 0 and 0.2 on the x-axis. For each of the three histograms 404a-404c, the first spike 410 has a peak at approximately 0.1 on the x-axis, with the peak value being between 0.8 and 1 on the y-axis. Similar to the discussion of the first spike 310 in FIG. 3B, the first spike 410 may correspond to the background of the scene 400. Because the depth of the background of the scene 400 remains substantially constant throughout the tracking of the target object (the dog), the first spike 410 is substantially constant across the three histograms 404a-404c. Additionally, each of the three histograms 404a-404c depict a threshold 405 at 0.8 on the x-axis.

The three histograms 404a-404c each depict a second spike 411. The second spike 411 may correspond to a depth of the dog as it travels through the scene 400. For example, the first histogram 404a is depicted and shows the first spike 410 representing the background at 0.1 on the x-axis and the second spike 411 representing the dog at 0.3 on the x-axis. This may correspond to the first instance of the dog when it is the most out of focus (for example, when it is at the farthest left point of the scene 400) and when the dog is at a farthest distance from the imaging equipment (in relation to the entire of scene 400). Arrow 415 may indicate that the depth of the dog is decreasing.

The second histogram 404b may represent a second point in the tracking of the dog through the scene 400. The second histogram 404b shows the first spike 410 maintained at 0.1 on the x-axis, while the second spike 411 representing the dog has moved from 0.3 on the x-axis of the first histogram 404a to approximately 0.5 on the x-axis of the second histogram 404b. This increased depth value on the x-axis may represent the dog having approached the imaging equipment (for example, a decreased depth in relation to the imaging device). As shown by the second, third, and fourth instances of the dog, the progression of the second spike 411 from 0.3 to 0.5 on the x-axis of the histograms 404*a* and 404*b* corresponds to the dog becoming more "in focus" and further approaching the imaging equipment. The third histogram 404*c* may represent a third point in the tracking of the dog through the scene 400. In the third histogram 404*c*, the first spike 410 is maintained at 0.1 along the x-axis and the second spike 411 has progressed from 0.5 on the x-axis of the second histogram 404*b* to approximately 0.9 along the x-axis, exceeding the threshold 405 at 0.8 on the x-axis. The histogram 404*c* may represent the dog being at or past the desired depth and may represent a point at which an image is captured by the imaging system. Alternatively, the imaging system may focus on the dog or begin a video or audio recording or perform any other action.

Figure 5:
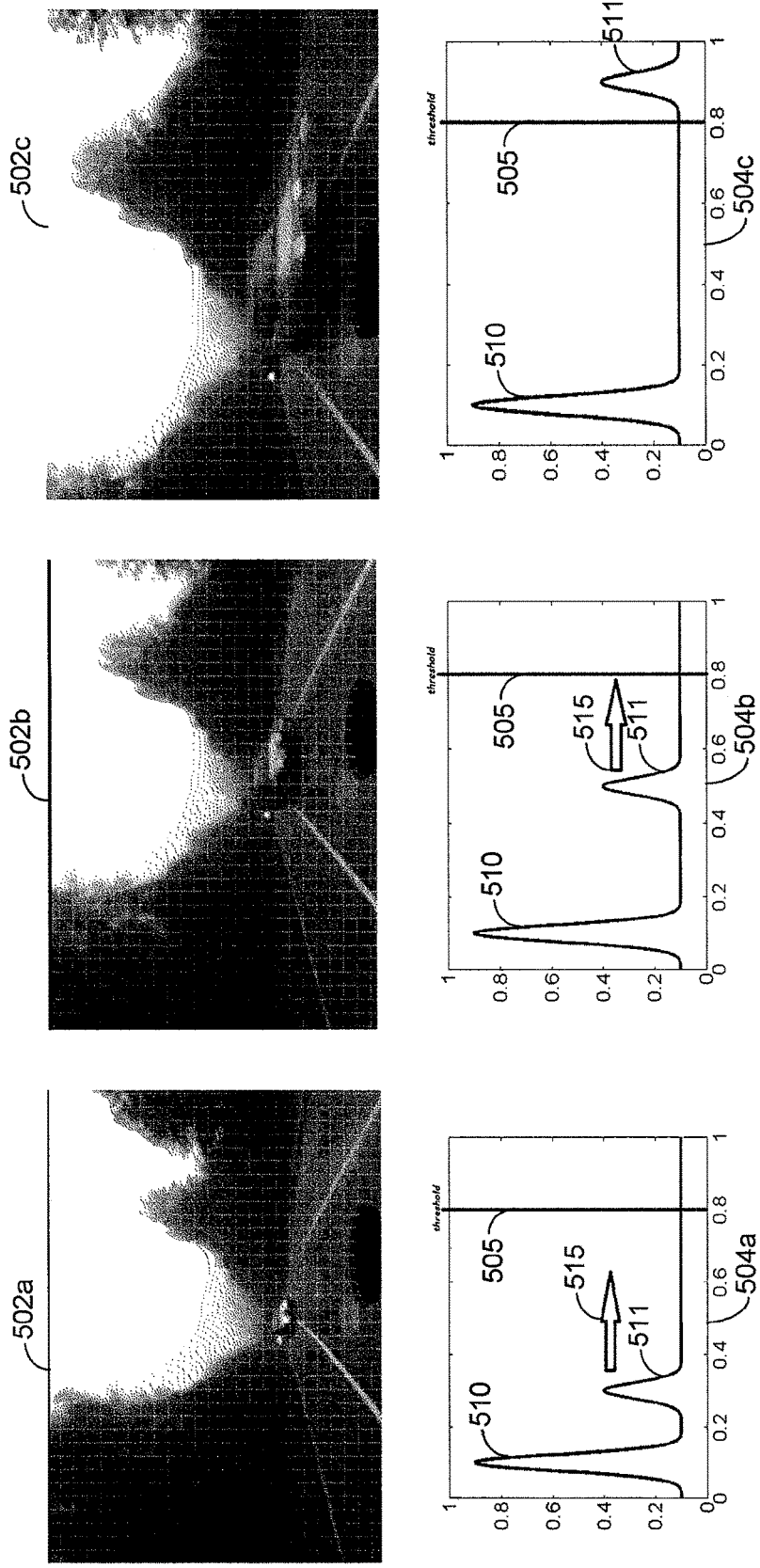
FIG. 5 illustrates an embodiment of the image capture device of FIG. 2 used in a collision detection use case.

FIG. 5 illustrates an embodiment of the image capture device of FIG. 2 as used in a collision detection use case. FIG. 5 shows an exemplary implementation of the depth-triggered event feature used to capture or avoid a collision with another object while the imaging equipment is either stationary or in motion. In some embodiments, the use case in FIG. 5 may identify the target object (a car) as it approaches the imaging equipment (for example, as the depth of the car reduces) and track the car until the car reaches a certain depth from the imaging equipment (corresponding to a depth threshold value). Once the car reaches the certain depth threshold, the imaging equipment may capture the image of the car about to collide with the imaging equipment or may activate some other response to the car crossing the depth threshold. For example, the imaging equipment may be configured to activate a braking system if the imaging equipment is mounted on a mobile device (e.g., a car or a bus). In some embodiments, the imaging equipment may be configured to activate a warning to the car, for example a visual or an audio signal or some other communication method.

As shown in FIG. 5, the target object may be a car that is approaching the imaging equipment in the opposing lane of traffic. FIG. 5 depicts three images 502*a*-502*c* from left to right, each image 502 progressing with the target image drawing nearer the imaging equipment capturing the images 502*a*-502*c*. The image 502*a* shows the target object (the car) just starting to cross over the center line of the road and entering oncoming traffic. The image 502*b* shows the car mostly crossed over the center line of the road (i.e, mostly in the lane of the imaging equipment) but still at a distance from the imaging equipment. The image 502*c* shows the target object entirely in the lane of the imaging equipment and much closer to the imaging equipment. Below the three images 502*a*-502*c* are three histograms 504*a*-504*c*. Each of the histograms 504*a*-504*c* corresponds to one of the three images 502*a*-502*c*. For example, the histogram 504*a* corresponds to the image 502*a*, the histogram 504*b* corresponds to the image 502*b*, and the histograms 504*c* corresponds to the image 502*c*.

As discussed above in relation to FIGS. 3 and 4, the three histograms 504*a*-504*c* each depict 2 spikes. The first spike 510 may represent the background of the lane of travel in which the imaging equipment is located or moving (or some other background as determined by the user or imaging equipment). The first spike 510 may have a peak at approximately 0.9 on the y-axis at a depth of approximately 0.1 on the x-axis. This value of 0.1 may indicate the focal point is at or near infinity. The second spike 511 may represent the car as it travels through the three images 502*a*-502*c*. For example, in the histogram 504*a*, the second spike 511 may be small along the y-axis (for example, peak at approximately 0.4) and at approximately 0.3 on the x-axis. In the histogram 504*b*, the first spike 510 remains at 0.1 on the x-axis, while the second spike 511 is shown having moved to 0.5 along the x-axis while maintaining a value of 0.4 along the y-axis. As discussed above, the arrow 515 may represent the movement of the second spike 511 along the x-axis as it corresponds to the movement of the car towards the imaging equipment. The image 502*c* shows the car at a closest point to the imaging equipment. Accordingly, the histogram 504*c* shows the second spike 511 corresponding to the car at its greatest location along the x-axis (at approximately 0.9), corresponding to its nearest location with regards to the imaging equipment. As the threshold indicated on the three histograms 504*a*-504*c* was set at 0.8 on the x-axis, the action attributed with the threshold value (e.g., the taking of a picture or activating of a braking system) may have activated when the target object met or exceeded the threshold value.

In some embodiments, the imaging system may be configured to perform or activate the action for an entire period or a portion thereof that the second spike 511 exceeds the threshold value. Thus, after the car crosses within the specified depth (for example, the second spike 511 meets or exceeds the threshold value of 0.8 along the x-axis), the braking system may be activated in order to attempt to avoid a collision for the entire period of time where the spike 511 is above 0.8 on the x-axis. In some embodiments, the depth-triggered event feature may be configured to detect a rate of change of depth in the field of view and may use the rate of change of depth to determine when to activate an action.

Figure 6:
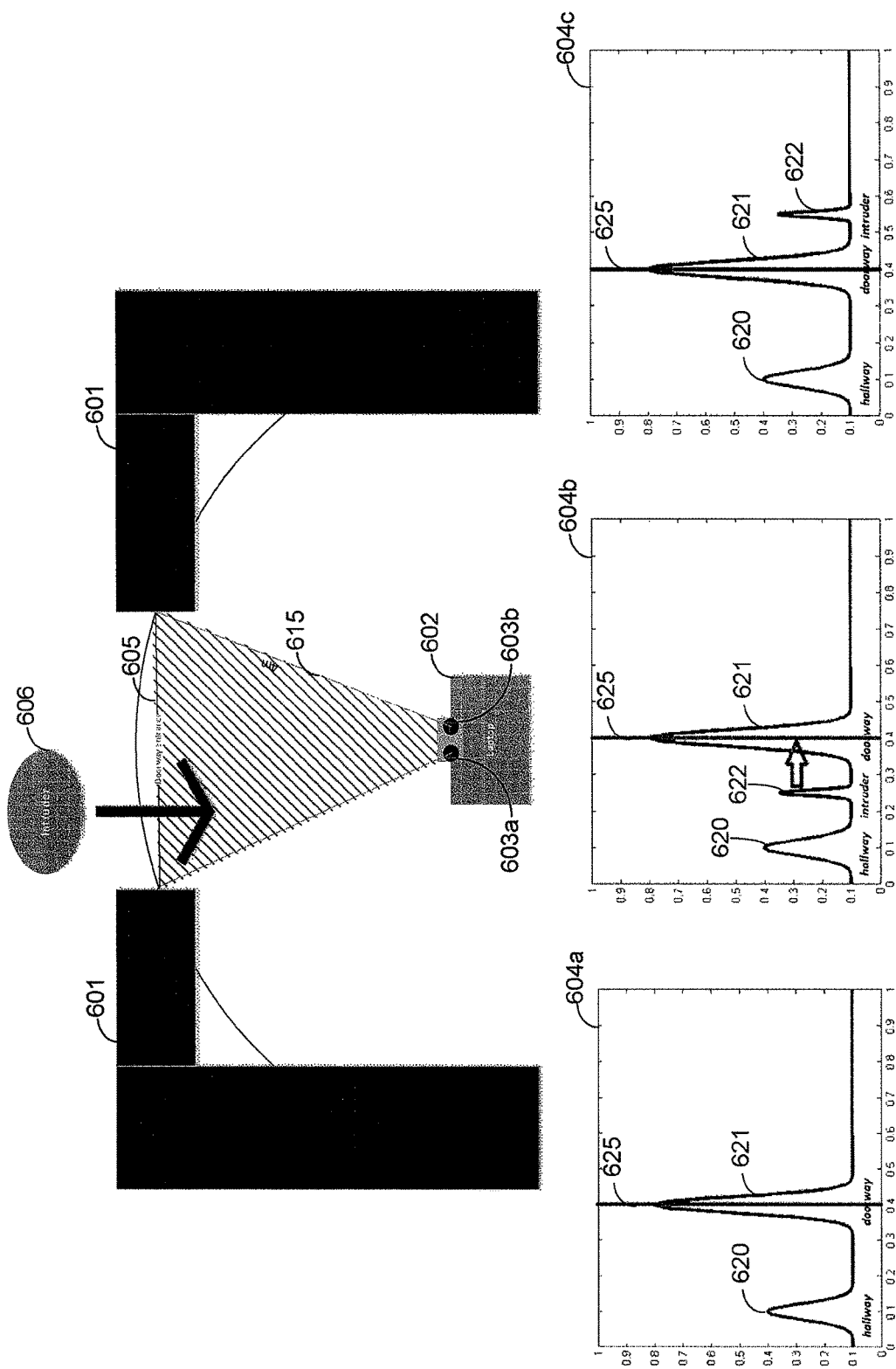
FIG. 6 illustrates an embodiment of the image capture device of FIG. 2 used in a motion detection at a specified depth use case.

FIG. 6 illustrates an embodiment of the image capture device of FIG. 1 used in a motion detection at a specified depth use case. FIG. 6 shows an exemplary implementation of the depth-triggered event feature used to detect or capture an intruder within a protected area using the imaging equipment positioned to monitor a protected area. In some embodiments, the use case in FIG. 6 may identify any entry of a target object through a doorway or may be positioned to monitor a specific item and identify entry of a target object in an area surrounding the specific item. When the imaging equipment is positioned such that the target object approaches the imaging equipment, the depth-triggered as it approaches the imaging equipment (for example, as the depth of the target object reduces) and track the target object until the target object reaches a certain depth from the imaging equipment (corresponding to a minimum depth threshold value). Once the target object reaches the certain depth, the imaging equipment may capture an image of the target object, for example, when the target object is about to collide with the imaging equipment or has entered into a monitored area, or the imaging equipment may activate some other response to the target object crossing the depth threshold. For example, the imaging equipment may be configured to activate an alarm or communicate with a security company. In some embodiments, the imaging equipment may be configured to activate a warning to the target object, for example a visual or an audio signal or some other communication method.

FIG. 6 shows a room formed by walls 601, according to some embodiments. Inside the room having walls 601 is shown a laptop 602 comprising an imaging device having optics 603*a* and 603*b*. In some embodiments, the optics 603*a* and 603*b* of the imaging device may comprise the optics of a web cam or other camera built-in the laptop. In some embodiments, the imaging device and optics 603*a* and 603b may comprise an external device merely connected to the laptop 602. In some embodiments, the depth-triggered feature may be implemented entirely within the imaging device having the optics 603a and 603b, when the imaging device is separate from the laptop 602. In some other embodiments, the depth-triggered feature may be implemented within the laptop 601, where the laptop 601 receives information regarding the depth of a target object from the external imaging device. In some embodiments, the laptop 601 may be replaced by any device (e.g., a smart phone, a smart watch, a tablet, etc.) capable of performing an action in response to depth information received from the imaging device (internal or external).

The FIG. 6 shows a doorway 605, represented as an, opening in the walls 601. An intruder 610 is shown outside the doorway 605. Additionally, an exemplary area 615 of the field of view of the optics 603a-603b is shown formed between the optics 603a and 603b of the imaging device and the doorway 605. Below the image of the room formed by walls 601 are three histograms 604a-604c. The three histograms 604a-604c may indicate the exemplary times in the monitoring of the area 61 between the imaging device and the doorway 605. The first histograms 604a may represent a depth map of the area 615 where only the doorway 605 and the hallways (not shown in the figure) outside the doorway are detected by the optics 603a and 603b of the imaging device. As shown in histogram 604a, there are two spikes 620 and 621. The first spike 620 represents the depth of the hallway. The depth of the hallway is shown having a peak of approximately 0.4 on the y-axis at approximately 0.1 on the x-axis. The second spike 621 represents the depth of the doorway 605. The depth of the doorway 605 is shown having a peak of approximately 0.8 on the y-axis at approximately 0.4 on the x-axis. Additionally, a depth threshold 625 is shown in histogram 604a at approximately 0.4 on the x-axis.

The second histogram 604b may represent the image shown in FIG. 6 of the room with the walls 601 containing the laptop 602 and the imaging device with optics 603a and 603b. In addition to the elements described above in relation to the first histogram 604a, the second histogram 604b comprises a third spike 622. The third spike 622 is shown having a peak between 0.3 and 0.4 on the y-axis at between 0.2 and 0.3 on the x-axis. Thus, the third spike 622 is shown between the first spike 620, representing the hallway, and the second spike 621, representing the doorway 605. The third spike 622 represents the intruder 606. Thus, as the intruder 606 is shown as being outside the doorway 605 of the room 600, the spike 622 representing the intruder 606 is shown between the spike 620 representing the hallway and the spike 621 representing the doorway 605.

The third histogram 604c represents a scenario where the intruder has crossed the doorway 605 into the area 615. The third histogram 604c is shown comprising the three spikes 620, 621, and 622. As described above in relation to histograms 604a and 604b, the third histogram 604c comprises the first spike 620 and the second spike 621 having the same peaks and at approximately the same locations long the x-axis and the threshold 625 at the same location along the x-axis. Additionally, the third histogram 604c further comprises the third spike 622 identified in relation to the second histogram 604b. However, unlike in the second histogram 604b, the third spike 622 representing the intruder 606 is shown at between 0.5 and 0.6 along the x-axis, having the same peak as described in relation to the second histogram 604b. Thus, the intruder 606 is indicated as having crossed the doorway 605 by being beyond the threshold 625. Once the intruder 606 enters the area 615 after crossing the doorway 605, the imaging device having optics 603a and 603b may be configured to capture a photo of the intruder or may be configured to activate an alarm or other indicator to indicate the intruder is within the area 615.

Figure 7:
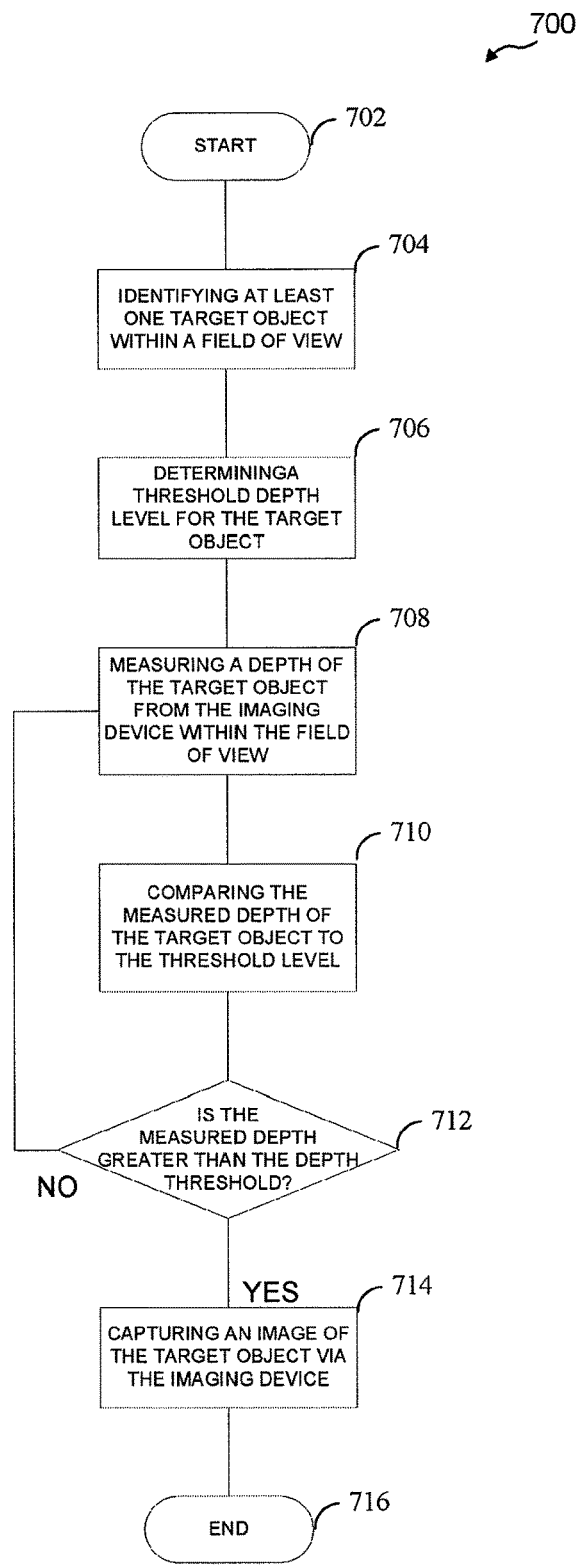
FIG. 7 illustrates a flow chart embodying an exemplary method for implementing a depth-triggered event feature.

FIG. 7 illustrates a flow chart embodying an exemplary method for implementing a depth-triggered event feature. The process 700 of FIG. 7 may be implemented by a mobile device or any other electronic device comprising the imaging equipment capable of performing accurate depth determinations of an object within the field of view of the imaging equipment. In some embodiments, as described above, the mobile device or other electronic device may comprise a stereo optic camera system or a structured light camera system or a shading camera system, or any other type of camera system capable of determine the depth of the target object. The process 700 may start at block 702. The start block 702 proceeds to the block 704 of the method 700, where the method 700 identifies at least one object in a field of view of an imaging device. In some embodiments, the at least one object may be identified at least partly based on input from a user. In some embodiments, the at least one object may be identified automatically by the device performing the method 700. The device may automatically identify the at least one object based on a determination of an object having a different depth than a majority of the frame or by the object having a varying depth with the field of view over a period of time or by the object entering the field of view during a specific time. After the at least one object is identified, the method 700 proceeds to block 706.

At block 706, the method 700 determines a threshold depth level. In some embodiments, the threshold depth level may be determined by user input, where the user may select the threshold depth level. In some embodiments, the threshold depth level may comprise a range of threshold depths, within which the at least one object must enter. In some embodiments, the threshold depth level or threshold depth range may be determined by the device performing the method 700 based at least in part on historical information, a minimum depth from the device, or any other basis. After the threshold depth level or levels are established, the method proceeds to block 708. At block 708, the depth of the at least one object within the field of view is measured with respect to the device or a background. In some embodiments, the depth of the at least one object may be measured using a stereo optic depth method or a disparity matching or mapping method In some embodiments, the depth of the at least one object may be measured using other depth measurement methods, for example structured light or shading methods. In other embodiments, any other depth measurement method may be applied to measure the depth of the at least one object in relation to the device or the background. Once the depth of the at least one object is measured, the method 700 proceeds to block 710.

At block 710, the method 700 compares the measured depth of the at least one object to the threshold depth level determined in block 706 and proceeds to block 712. At block 712, if the measured depth of the at least one object is less than the threshold depth level (for example, the at least one object is farther away from the device than the depth indicated by the threshold depth level, then the method 700 returns to block 708 and repeats the measuring and comparing blocks (blocks 708 and 710) until the measured depth is greater than the threshold depth level at block 712. When the measured depth is greater than the threshold depth level (for example, the at least one object is closer to the device than the threshold depth level, then the method may proceed to block 714. At block 714, the method 700 may trigger an action based on the measured depth being greater than the threshold depth level. For example, the method 700 may trigger any of the actions described above in relation to the use cases of FIGS. 3A, 3B, and 4-6. In some embodiments, the method 700 may trigger any other external action.

In some embodiments, the imaging equipment may be integrated into a device capable of processing information generated by the imaging equipment. For example, the device may be a stereo camera or other camera capable of generated and interpreting depths of objects within the field of view of the camera. In other embodiments, the imaging equipment (for example, the equipment capable of capturing frames of the field of view) may be separate from the processing equipment (for example, a laptop with an external webcam or a camera connected to any video or image processing system). Additionally, in some embodiments, the width of the spikes of FIGS. 3A, 3B, and 4-6 may vary based on the target object. If the target object has multiple depths (e.g., the target object is a large object that has varying depth in relation to the imaging equipment), then the spike may cover more area in relation to the x-axis. In some embodiments, the size of the spike (area covered) may not indicate any characteristic of the target object.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for capturing an image of an object in a scene, comprising:
   identifying, via two or more cameras of an imaging device, a target object in a field of view of the imaging device;
   measuring, via the two or more cameras of the imaging device, a depth of the target object within the field of view of the imaging device;
   comparing the measured depth of the target object to a threshold depth level; and
   capturing an image of the target object, via at least one of the two or more cameras used to measure the depth of the target object, when the depth of the target object exceeds the threshold depth level, wherein the target object is closer to the imaging device when the depth of the target object exceeds the threshold depth level than when the depth of the target object is less than the threshold depth level.

2. The method of claim 1, wherein measuring the depth of the target object within the field of view comprises using disparity values of images including the target object captured by the two or more cameras.

3. The method of claim 2, further comprising measuring a depth of the background based at least in part on the disparity values.

4. The method of claim 1, further comprising:
   identifying, via the two or more cameras of the imaging device, a background of the scene in the field of view of the imaging device; and
   determining a depth of the background,
   wherein the threshold depth level is less than the depth of the background.

5. The method of claim 1, wherein the imaging device comprises a stereo optics camera comprising the two or more cameras.

6. The method of claim 1, wherein the imaging device comprises a structured light 3D scanner.

7. The method of claim 1, further comprising triggering an event based on the measured depth of the object exceeding the threshold level.

8. The method of claim 7, wherein the triggered event comprises at least one of focusing the imaging device, activating an alarm, recording a video, recording a sound, and enabling an external action.

9. The method of claim 1, wherein the image is captured when the depth of the object within the field of view is within a threshold depth range.

10. The method of claim 1, further comprising determining the threshold level using input from a user.

11. The method of claim 1, wherein the threshold level is determined automatically by the imaging device based on an average of the measured depth of the field of view.

12. An apparatus for capturing a scene, comprising:
   an imaging system comprising two or more cameras and configured to capture at least one image in a field of view of the imaging system;
   a processor operably coupled to the imaging system, the processor configured to:
   identify, using images captured by the two or more cameras of the imaging system, at least one target object in the field of view;
   measure, using the two or more cameras, a depth of the target object within the field of view with respect to the imaging system;
   compare the measured depth of the target object to a threshold depth level; and
   capture an image of the target object via at least one of the two or more cameras of the imaging system when the depth of the target object within the field of view exceeds the threshold depth level, wherein the target object is closer to the imaging system when the depth of the target object exceeds the threshold depth level than when the depth of the target object is less than the threshold depth level.

13. The apparatus of claim 12, wherein the processor is further configured to measure a depth of the target object using disparity values of images including the target object captured by the two or more cameras.

14. The apparatus of claim 13, wherein the processor is further configured to measure a depth of the background based at least in part on the disparity values.

15. The apparatus of claim 13, wherein the processor is further configured to:
   identify a background of the scene in the field of view of the imaging device; and determine a depth of the background based at least in part on the disparity values, wherein the threshold depth level is less than the depth of the background.

16. The apparatus of claim 12, wherein the imaging device comprises a stereo optics camera.

17. The apparatus of claim 12, wherein the imaging device comprises a structured light 3D scanner.

18. The apparatus of claim 12, wherein the processor is further configured to trigger an event based on the measured depth of the target object exceeding the threshold depth level.

19. The apparatus of claim 18, wherein the triggered event comprises at least one of focusing the imaging device, activating an alarm, recording a video, recording a sound, and enabling an external action.

20. The apparatus of claim 12, wherein the image is captured when the depth of the target object within the field of view is within a threshold range.

21. The apparatus of claim 12, wherein the processor is further configured to determine the threshold depth level using input from a user.

22. The apparatus of claim 12, wherein the processor is configured to determine the threshold depth level automatically based on an average of the measured depth of the field of view.

23. An apparatus for capturing a scene, comprising:
means for identifying a target object in a field of view of the apparatus, the apparatus having a plurality of means for capturing images of the field of view;
means for measuring a depth of the target object, via the plurality of means for capturing images, within the field of view with respect to the apparatus;
means for comparing the measured depth of the target object to a threshold depth level; and
means for capturing an image of the target object, via the plurality of means for capturing images when the depth of the object within the field of view exceeds the threshold depth level, wherein the target object is closer to the apparatus when the depth of the target object exceeds the threshold depth level than when the depth of the target object is less than the threshold depth level.

24. The apparatus of claim 23, wherein the means for measuring a depth comprises a process for determining disparity values of stereo images captured by the plurality of means for capturing images.

25. The apparatus of claim 24, further comprising means for measuring a depth of the background.

26. The apparatus of claim 24, further comprising:
means for identifying a background of the scene in the field of view of the apparatus;
means for determining a depth of the background based at least in part on the disparity values, wherein the threshold depth value is less than the depth of the background.

27. The apparatus of claim 23, wherein the apparatus comprises a stereo optics camera.

28. The apparatus of claim 23, wherein the apparatus comprises a structured light 3D scanner.

29. The apparatus of claim 23, further comprising means for triggering an event based on the measured depth of the target object exceeding the threshold depth level.

30. The apparatus of claim 29, wherein the triggered event comprises at least one of focusing the apparatus, activating an alarm, recording a video, recording a sound, and enabling an external action.

* * * * *